(12) United States Patent
Iino et al.

(10) Patent No.: US 9,257,849 B2
(45) Date of Patent: Feb. 9, 2016

(54) ELECTRICAL QUANTITY ADJUSTING APPARATUS, ELECTRICAL QUANTITY ADJUSTING METHOD, ELECTRICAL QUANTITY ADJUSTING PROGRAM AND POWER SUPPLY SYSTEM

(75) Inventors: Yutaka Iino, Kawasaki (JP); Kyosuke Katayama, Asaka (JP); Yoshiaki Hasegawa, Chofu (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 775 days.

(21) Appl. No.: 13/552,023

(22) Filed: Jul. 18, 2012

(65) Prior Publication Data

US 2013/0024034 A1    Jan. 24, 2013

(30) Foreign Application Priority Data

Jul. 22, 2011    (JP) .................. 2011-161278

(51) Int. Cl.
    *H02J 3/38* (2006.01)
(52) U.S. Cl.
    CPC ................ *H02J 3/383* (2013.01); *H02J 3/386* (2013.01); *Y02E 10/563* (2013.01); *Y02E 10/763* (2013.01)
(58) Field of Classification Search
    CPC ........ H02J 3/383; H02J 3/386; Y02E 10/763; Y02E 10/563
    See application file for complete search history.

(56) References Cited

U.S. PATENT DOCUMENTS

| | | | |
|---|---|---|---|
| 5,903,064 A * | 5/1999 | Norberg | ........................ 307/40 |
| 6,018,690 A | 1/2000 | Saito et al. | |
| 6,735,619 B1 | 5/2004 | Sawada | |
| 6,925,361 B1 | 8/2005 | Sinnock | |
| 7,979,166 B2 | 7/2011 | Yamada et al. | |

(Continued)

FOREIGN PATENT DOCUMENTS

| | | |
|---|---|---|
| CN | 101682195 A | 3/2010 |
| EP | 1742321 A1 | 1/2007 |

(Continued)

OTHER PUBLICATIONS

Wei Ren et al; Distributed Consensus in Multi-Vehicle Cooperative Control; 2008; pp. 2-5, 26 and 38-41; published by Springer-Verlag.

(Continued)

*Primary Examiner* — Robert Fennema
*Assistant Examiner* — Fenyang Stewart
(74) *Attorney, Agent, or Firm* — Holtz, Holtz & Volek PC

(57) ABSTRACT

According to one embodiment, an electrical quantity adjusting apparatus connected to an electrical facility includes a memory unit that stores a target level which is a target electrical quantity, a presenting level deciding unit that decides a presenting level to an exterior, the presenting level being an electrical quantity relating to the electrical facility and corresponding to at least a part at the target level, a presenting level output unit that outputs the presenting level decided by the presenting level deciding unit to the exterior via a communication network, a presenting level receiving unit that receives a presenting level from the exterior via the communication network, and an adjusting unit that adjusts the electrical quantity relating to the electrical facility based on the target level, the presenting level decided by the presenting level deciding unit, and the presenting level received by the presenting level receiving unit.

15 Claims, 9 Drawing Sheets

(56) References Cited

U.S. PATENT DOCUMENTS

| | | | |
|---|---|---|---|
| 8,774,979 B2 | 7/2014 | Yano et al. | |
| 2007/0027654 A1* | 2/2007 | Nagafuchi et al. | 702/185 |
| 2008/0046387 A1* | 2/2008 | Gopal et al. | 705/412 |
| 2008/0234871 A1 | 9/2008 | Yamada et al. | |
| 2010/0057625 A1* | 3/2010 | Boss | G06Q 30/0206 705/80 |
| 2011/0178643 A1* | 7/2011 | Metcalfe | 700/276 |
| 2012/0158202 A1 | 6/2012 | Yano et al. | |

FOREIGN PATENT DOCUMENTS

| | | |
|---|---|---|
| EP | 2477307 A1 | 7/2012 |
| JP | 10-94199 A | 4/1998 |
| JP | 1198694 A | 4/1999 |
| JP | 2001053779 A | 2/2001 |
| JP | 2004229266 A | 8/2004 |
| JP | 2009100550 A | 5/2009 |
| WO | 2011030472 A1 | 3/2011 |

OTHER PUBLICATIONS

Chinese Office Action dated Apr. 3, 2014 in counterpart Chinese Application No. 201210236674.2.

Extended European Search Report dated Apr. 29, 2015, issued in counterpart European Application No. 12174696.0.

Japanese Office Action dated Feb. 3, 2015, issued in counterpart Japanese Application No. 2011-161278.

* cited by examiner

ELECTRICAL QUANTITY ADJUSTING APPARATUS, ELECTRICAL QUANTITY ADJUSTING METHOD, ELECTRICAL QUANTITY ADJUSTING PROGRAM AND POWER SUPPLY SYSTEM

This application is based upon and claims the benefit of priority from Japanese Patent Application No. 2011-161278, filed Jul. 22, 2011; the entire contents of which are incorporated herein by reference.

FIELD

The present invention relates to an electrical quantity adjusting apparatus, an electrical quantity adjusting method, an electrical quantity adjusting program and a power supply system for adjusting electrical quantities of a plurality of electrical facilities.

BACKGROUND

The power supply to the load systems, such as a building, a factory, a social infrastructure, and a home, is mainly borne by a power supply system including a large-scale electrical power plant and power transmission and distribution facilities. However, because of a countermeasure for recent global environmental issues, a trouble of the power system at the time of a disaster and a recovery therefrom, and a need for power supply insufficiency, a power supply system including distributed power sources like solar power generator facilities is gradually adopted.

However, the distributed power source utilizing natural energy has unstable power generation. For example, solar power generator facilities having an energy source that is solar light have the power generation largely depending on a season, a weather, and a time, etc. Hence, the solar power generator facilities are unable to stably supply power to the load system.

In order to complement such unstable power supply capability, there is proposed the above-explained power supply system equipped with battery facilities. For example, excessive power generated by the solar power generator facilities is charged in the battery facilities in advance. When the power generation by the solar power generator facilities becomes insufficient, the battery facilities discharge the power, thereby compensating the insufficiency of the power.

In order to appropriately utilize the electrical facilities, such as the solar power generator facilities, the battery facilities, and the load system, it is necessary for the power supply system to manage so as to balance the whole supply and demand of the power.

Hence, the power supply system always monitors the power generation level by the solar power generator facilities, the charging/discharging level by the battery facilities, and the power receiving level by the load system. The power supply system controls the supply-demand balance in such a way that the contracted receiving power and the reverse power flow do not exceed the desired conditions.

FIG. 9 shows an illustrative power supply system. This power supply system includes solar power generator facilities PV having solar panels, batteries S, a load L, power conditioners PCS, and an energy managing system EMS, etc. The solar power generator facilities PV, the batteries S, and the load L are connected to a power receiving point Z from a commercial system.

The power conditioner PCS has a function as an inverter device for power conversion, and is connected in the system between the solar power facilities PV and the batteries S. Each power conditioner PCS is connected to the energy managing system EMS via a communication network N. The energy managing system EMS comprehensively controls the power generation level by the solar power generator facilities PV and the charging/discharging level by the battery S through respective power conditioners PCS.

It is now examined that, for example, the power generation level by the solar power generator facilities PV and the power receiving level of the demand pattern by the power load L become vary. Even in this case, the energy managing system EMS intensively performs control in such a way that the contracted receiving power and the reverse power flow, etc., from power receiving from a commercial system do not exceed the desired conditions. Recently, such a supply-demand balancing control is finely tuned at a cycle of, for example, 10 ms to 100 ms.

In the meanwhile, according to the electrical facilities that are structural elements of the above-explained power supply system always change the characteristics, such as a power generation level, a charging/discharging level, and a power receiving level. For example, it is already mentioned above that the solar panel has the power generation varying depending on a season, a time, a solar irradiation condition, and a temperature condition. Moreover, the solar panel changes the power generation level due to dirt on the surface, and shading by the other object, etc. Furthermore, the battery has the characteristics deteriorated as time advances, and the energy accumulating level also changes. Still further, the power consumption by the load has inherent load pattern.

Hence, the power supply system needs a redesigning of the system and the tuning thereof, etc., in order to appropriately manage the power depending on the above-explained characteristic change. The factors for the need of redesigning and tuning, etc., also include, in addition to the above-explained factors, a change in the use condition of the structural elements, a change across the ages (not limited to the battery), and a change in the system configuration like addition/elimination of a structural element, etc. However, management of the redesigning and tuning, etc., in consideration of such factors needs large amounts of costs and engineering works.

Since the energy managing system intensively controls the supply-demand balance of the whole power supply system, the arithmetic operation quantity at a location is enormous. Hence, the more the structural element increases, and the more the above-explained change becomes frequent, the more the process load to the energy managing system increases. In order to cope with this situation, increasing the process capability of the energy managing system has a poor readiness to a change in the condition and is restricted from the standpoint of costs.

The present invention has been made to address the above-explained technical issues of the conventional technologies, and it is an object of the present invention to provide an electrical quantity adjusting apparatus, an electrical quantity adjusting method, an electrical quantity adjusting program and a power supply system which can flexibly cope with a change in the condition of electrical facilities and which can appropriately adjust an electrical quantity.

DETAILED DESCRIPTION

With an embodiment of the invention, an electrical quantity adjusting apparatus includes a memory unit and a control unit, and also includes the following technical features.

(1) The memory unit includes a target level memory section that stores a target level which is a target electrical quantity.

(2) The control unit includes a negotiation unit.

(3) The negotiation units includes the following units.

(a) A presenting level deciding unit that decides a presenting level to an exterior, the presenting level being an electrical quantity relating to an electrical facility to be connected and corresponding to at least a part of the target level.

(b) A presenting level output unit that outputs the presenting level decided by the presenting level deciding unit to the exterior via a communication network;

(c) A presenting level receiving unit that receives a presenting level from the exterior via the communication network.

(d) An adjusting unit that adjusts the electrical quantity relating to the electrical facility based on the target level, the presenting level decided by the presenting level deciding unit, and the presenting level received by the presenting level receiving unit.

Other embodiments of the present invention include a method for realizing the above-explained functions of respective units by a computer or an electrical circuit and a program that causes the computer to realize the above-explained functions. Moreover, still other embodiment includes a power supply system that is connected to a managing device via a communication network.

According to the above-explained aspects, it becomes possible to provide an electrical quantity adjusting apparatus, an electrical quantity adjusting method, an electrical quantity adjusting program and a power supply system which can flexibly cope with a change in the condition of electrical facilities and which can appropriately adjust an electrical quantity.

<Outline of Embodiment>

Figure 1:
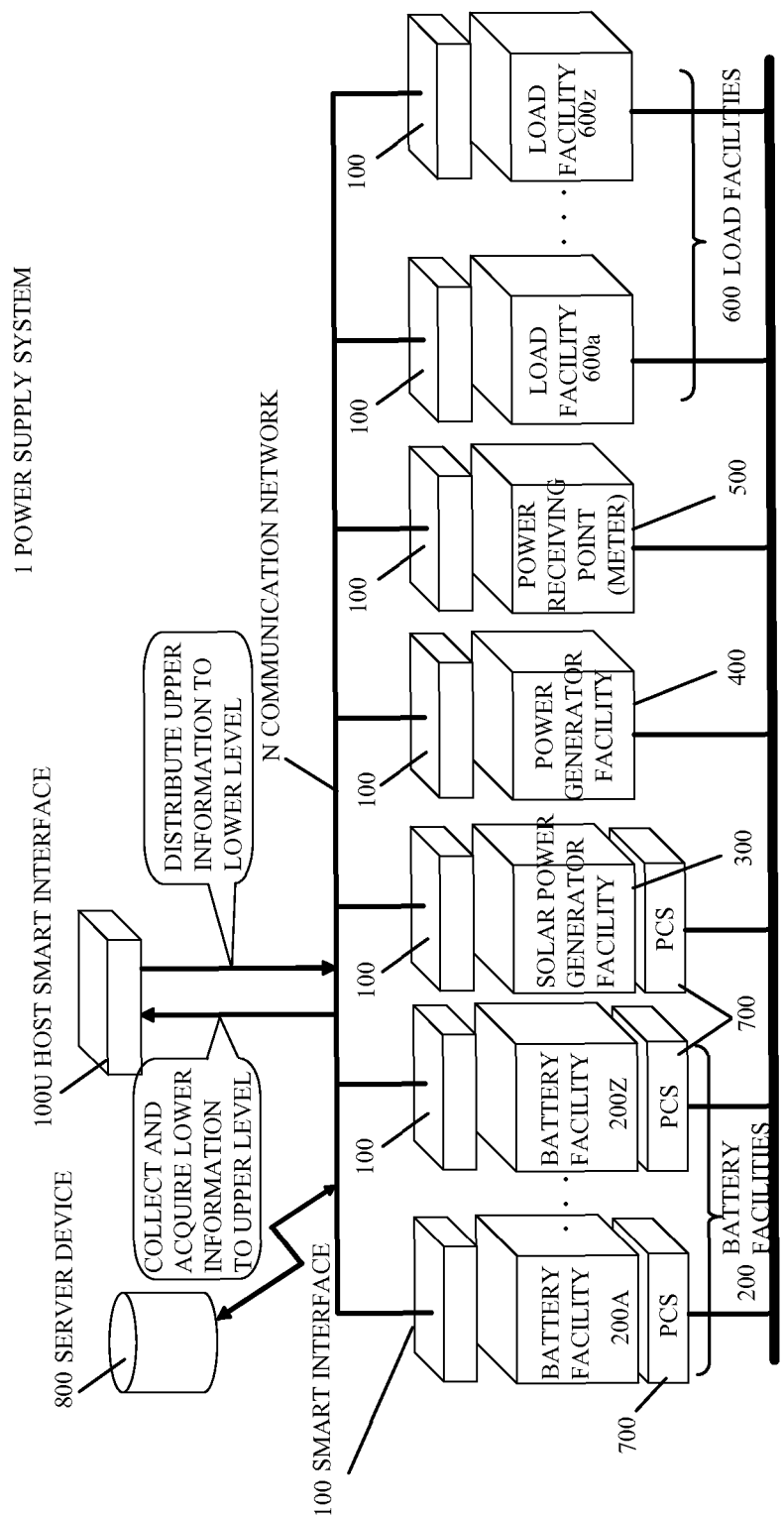
FIG. 1 is a connection configuration diagram showing an illustrative power supply system according to an embodiment of the present invention.
Figure 2:
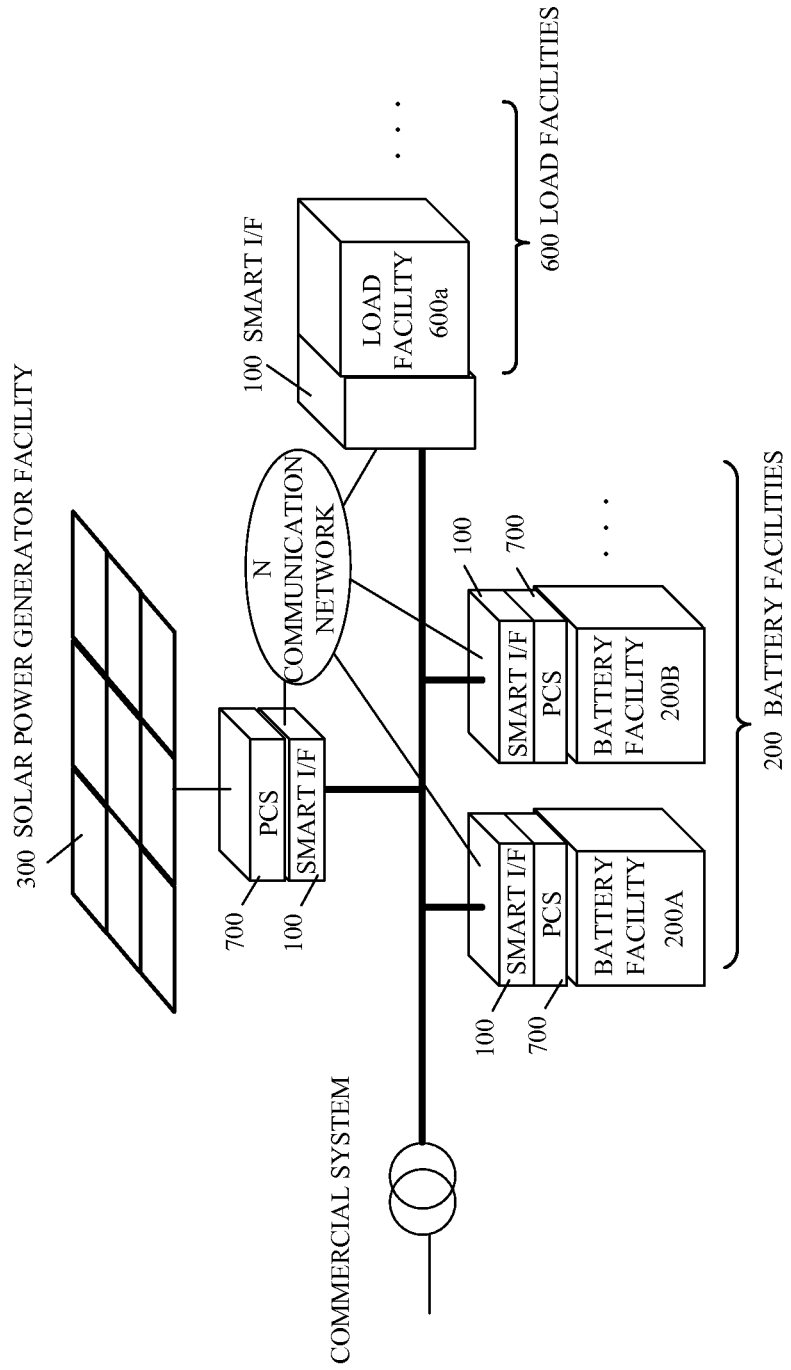
FIG. 2 is a connection configuration diagram showing an illustrative power supply system according to the embodiment.

An embodiment of the present invention relates to, as shown in FIGS. 1 and 2, a power supply system 1 that distributingly controls a plurality of electrical facilities connected together via a common power supply line through a plurality of smart interfaces 100. The electrical facilities include battery facilities 200 connected to the system, a solar power generator facility 300, a power generator facility 400, a power receiving point (meter) 500, and a load facilities 600, etc. Each electrical facility may be a solo facility or plural facilities.

The battery facilities 200 and the solar power generator facility 300 are connected to the system via respective power conditioners (hereinafter, referred to as PCSs) 700. The PCS 700 is capable of controlling a power generation level and a charging/discharging level, etc., as explained above.

Each electrical facility is connected to an electrical quantity adjusting apparatus (hereinafter, referred to as a smart interface) 100. Those smart interfaces 100 are connected to a communication network N, and have a communication function of exchanging information therebetween.

Moreover, the smart interface 100 has, in addition to the above-explained communication function, a control logic to the locally connected electrical facility, and is capable of executing various processes to be discussed later.

A host managing device (hereinafter, referred to as a host smart interface) 100U is also connected to the communication network N. The host smart interface 100U collects and acquires information from the plurality of smart interfaces 100 to manage those.

Furthermore, a server device 800 is connected to the communication network N. The server device 800 collects and stores information necessary for each smart interface 100 and the host smart interface 100U and other information.

<Configuration of Embodiment>

Next, an explanation will be given of the configuration of each portion of the above-explained power supply system 1.

<<Smart Interface>>

Figure 3:
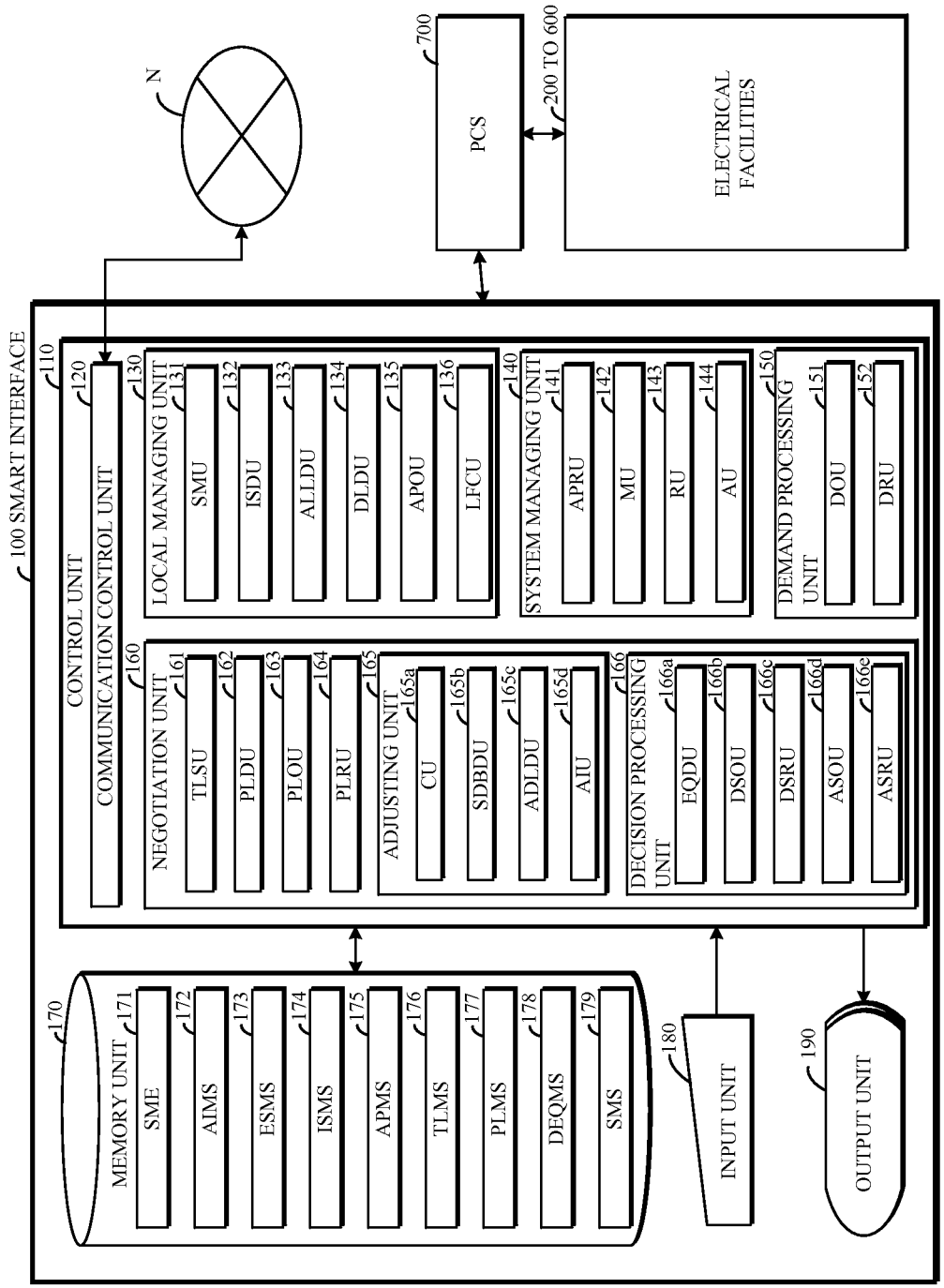
FIG. 3 is a block diagram showing an illustrative smart interface of the embodiment.

As shown in FIG. 3, the smart interface 100 includes a control unit 110, a memory unit 170, an input unit 180, and an output unit 190, etc.

<1. Control Unit>

The control unit 110 includes a communication control unit 120, a local managing unit 130, a system managing unit 140, a demand processing unit 150, and a negotiation unit 160, etc.

(1) Communication Control Unit

The communication unit 120 exchanges information necessary for the process by the smart interface 100 via the communication network N. Information output by each output unit to be discussed later is transmitted by the communication control unit 120 to another smart interface 100. Moreover, information received by the communication control unit 120 from another smart interface 100 is received by each receiving unit to be discussed later.

(2) Local Managing Unit

The local managing unit 130 manages information on each smart interface 100 and the electrical facility connected thereto. The electrical facility connected to each smart interface 100 is referred to as a local facility. The local managing unit 130 includes a software managing unit (SMU) 131, an internal state detecting unit (ISDU) 132, an allowable level determining unit (ALLDU) 133, a demanded level determining unit (DLDU) 134, an attribute parameter output unit (APOU) 135, and a local facility control unit (LFCU) 136, etc.

The software managing unit 131 manages a software necessary for each smart interface 100 for local communication, monitoring, and control process, etc. It is not illustrated in the figure but the software managing unit 131 includes a version determining unit, a downloading unit, and updating unit, etc.

The version determining unit inquires a software including latest data and a program, etc., to the server device 800, etc., over the communication network N, and determines the version of the software stored in the memory unit 170. The inquiry can be automatically performed at a preset timing or performed in accordance with an input given from the input unit 180.

The downloading unit downloads the latest version software when the version determining unit determines that the present version is not the latest. The updating unit updates the software stored in the memory unit 170 to the downloaded and latest version.

An example software is a power-generation-level predicting model of the solar power generator facility 300. In general, each solar power generator facility 300 includes a local power-generation-level predicting model. The power-generation-level predicting model is updated as needed based on data of past records. Moreover, the power-generation-level predicting model is also updated as needed in accordance with a change across the ages like the deterioration of solar panels.

Hence, it is desirable to periodically update the power-generation-level predicting model. Accordingly, the software managing unit 131 periodically accesses the server device 800, and when there is the latest power-generation-level predicting model available, downloads such a model for updating. The predicted level calculated by the power-generation-level predicting model is a part of attribute parameters to be discussed later.

The internal state detecting unit 132 detects the internal state of the local facility based on a signal from a measuring device, etc., installed in the local facility. For example, the internal state detecting unit 132 is capable of detecting the power generation level of the local facility, the power accumulating level, the power receiving level, the power level that can be supplied by the local facility, the necessary power level and a change level therein, etc. The internal state detecting unit 132 is also capable of detecting the level of deterioration and operation/non-operation, etc., based on the signal from the measuring device, etc. The internal state is a part of the attribute parameters to be discussed later.

The allowable level determining unit 133 determines an electrical quantity (an allowable level) that the local facility can supply based on the internal state and the other attribute parameters, etc. The electrical quantity in this case includes the power level that the solar power generator facility 300 and the power generator facility 400 can supply and the power level releasable by the battery facilities 200, etc.

The demanded level determining unit 134 determines an electrical quantity (a demanded level) necessary for the local facility based on the internal state and the other attribute parameters, etc. The electrical quantity in this case includes an electrical quantity (a power receiving level) necessary for the load facilities 600, etc. The allowable level and the demanded level, etc., are also some of the attribute parameters.

The attribute parameter output unit 135 outputs the attribute parameters relating to the local facility to the exterior. The communication control unit 120 transmits the attribute parameters to another smart interface 100, the host smart interface 100U, and the server device 800, etc. Hence, each smart interface 100, the host smart interface 1000, and the server device 800, etc., can share the attribute parameters.

As the attribute parameters, the following pieces of information are considerable but the present invention is not limited to those pieces of information.

(a) Predicted Response

A predicted response is, for example, a predicted level of the power generation level or power receiving level of an electrical facility in a continuous time in future. Respective smart interfaces 100 exchange the predicted responses one another to share those, thereby becoming able to predict the behavior of the electrical facility of the communication partner. The predicted level includes an SOC (State Of Charge) of each battery facility 200.

(b) Sensitivity Characteristic Model

A sensitivity characteristic model is information indicating the response of the electrical facility in response to a change in the frequency of a voltage, and a value of power generating/receiving instruction. Based on the sensitivity characteristic model, each smart interface 100 is capable of estimating the behavior of the electrical facility of the communication partner in response to a change in the instruction to the electrical facility of the communication partner, and the power condition like a voltage or a frequency. For example, in the case of the load facility, the behavior of each electrical facility in accordance with a change in various parameters can be known, such as a load change to a change in the voltage, a change in the rotating speed and the output to a change in the frequency.

(c) Constraint Condition

The constraint condition relates to constraints for a power generation level, a power receiving level, a voltage, and a current. By sharing the constraint condition, each smart interface 100 can consider an operation condition that should be satisfied by the structural element of the communication partner. In particular, the contracted power at the power receiving point is the constraint condition.

(d) Cost Coefficient

A cost coefficient relates to costs for power generation or power reception. For example, a coefficient in consideration of an energy charge, a deterioration of the battery due to the repeat of charging/discharging, an internal resistance, installation costs of a facility, and an aging deterioration can be the cost coefficient. The cost coefficient relating to the power generation costs and a charging/discharging loss can be useful for calculation of the optimized load distribution.

(e) Information on Controllability, Observability and Predictability

Those pieces of information relate to, for the state of each electrical facility, whether or not it is controllable (controllability), whether or not it is observable (observability), and whether or not it is predictable (predictability). For example, the power generation level of the solar battery cannot be controlled but the power generation level of the power generator is controllable.

In the case of old facilities, observation of data is difficult or is unable. Depending on the facilities, one can operate as predicted for the power generation level and the power receiving level but the other is unpredictable. Those are ranked depending on the possibility level, and can be used as a preference order of negotiation to be discussed later, and a determination criterion whether or not to negotiate.

(f) Positional Information

This is the information relating to respective positions of nodes over the communication network N, such as each smart interface 100, and the host smart interface 100U. For example, an IP address can be used as the positional information. Based on such positional information, it is possible to determine whether the electrical facility of the communication partner is in a higher hierarchy or a lower hierarchy relative to the local facility, whether or not it is parallel thereto, and whether or not it adjoins thereto, etc. Moreover, by determining a distance between the electrical facility of the communication partner and the local facility over the communication network N, and such a determined distance is useful for determination of the preference order of negotiation.

(g) Unique Information

This is information unique to each device, such as each smart interface 100, the host smart interface 100U, or each electrical facility. For example, when a device is connected to the communication network N, the name of production maker, the model number, etc., are shared by respective smart interfaces 100, and the host smart interface 100U as information unique to the device. Moreover, a MAC address searched based on the production maker name and the model number is also included in the unique information.

The local facility control unit 136 controls the operation of the local facility. When an electrical quantity, etc., is set through a negotiation to be discussed later, the control by the local facility control unit 136 follows such determination. For example, in the case of the battery facilities 200, and the solar power generator facility 300, power feeding is started upon a control through the PCSs 700. Moreover, in the case of the load facilities 600, power receiving is started.

(3) System Managing Unit

The system managing unit 140 manages the state of each device configuring the whole power supply system 1. The system managing unit 140 includes an attribute parameter receiving unit (APRU) 141, a monitoring unit (MU) 142, a registering unit (RU) 143, and an authenticating unit (AU) 144, etc.

The attribute parameter receiving unit 141 receives the attribute parameters from the exterior. The attribute parameters received from another smart interface 100, the host smart interface 100U, and the server device 800 by the communication control unit 120 are also available.

The monitoring unit 142 monitors respective soundness of each electrical facility, smart interface 100, and the communication network N. As explained above, the attribute parameter output unit 135 of each smart interface 100 outputs a signal relating to the soundness (some of the attribute parameters like the internal state) of each electrical facility to the communication partner.

The attribute parameter receiving unit 141 receives such a signal relating to the soundness as the attribute parameter, and stores the received attribute parameter in the memory unit 170. The monitoring unit 142 determines the state of communication partner for each other based on such attribute parameters, and stores the determination result as an external state in the memory unit 170.

For example, provided that there are plural groups of battery facilities 200, respective monitoring units 142 of the battery facilities 200 periodically check the soundness of the function of the battery facility 200 that is the communication partner for each other. At this time, when the characteristic deterioration of some battery facilities 200 is found, a load distribution for eliminating such characteristic deterioration can be realized.

When, for example, there is a behavior different from predicted value notified in advance by each smart interface 100 for the power generation level, and the discharging level of the local facility and the consumption level of the load, etc., it can be a determination criteria for the soundness. Moreover, the soundness of each electrical facility can be determined based on the parameters, such as the controllability, and the predictability.

The monitoring unit 142 can monitor the soundness of the node configuring the communication network N. In general, the status of the communication network N can be checked through an exchange of a keep-alive signal, and the checked status can be stored in the memory unit 170 as an external state.

The registering unit 143 registers an electrical facility, etc., newly connected via the smart interface 100. As explained above, this registration can be carried out by causing the attribute parameter receiving unit 141 received the positional information, the unique information or the other attribute parameters, etc., to store such information in the memory unit 170. The information of the newly registered smart interface 100 can be grasped as a node of the communication network N by the monitoring unit 142, and is stored in the memory unit 170 as an external state.

The authenticating unit 144 authenticates each smart interface 100, the host smart interface 100U, and the server device 800, etc., based on the positional information, the unique information, or the other attribute parameters stored in the memory unit 170. Typical identification information for authentication are the positional information and the unique information. However, some of the attribute parameters can be identification information in solo or in plural sets. Identification information for security like a registration number and a password can be subjected to the authentication by the authenticating unit 144.

The system managing unit 140 refers to the attribute parameters at the time of the attribute parameter receiving process, the monitoring process, and the registration process, and the authentication process, etc., to recognize the characteristics of the communication partner for each other. For example, provided that there are plural groups of battery facilities 200, respective battery facilities 200 recognize the charging/discharging characteristic, the charging capacity, and the maximum allowable current, etc., of the communication partner for each other, which is useful for the load distribution in accordance with the recognized characteristics.

(4) Demand Processing Unit

The demand processing unit 150 processes a demand from the smart interface 100. The demand processing unit 150 includes a demand output unit (DOU) 151, and a demand receiving unit (DRU) 152, etc. The demand output unit 151 outputs a demanded level of the electrical quantity of the local facility to another electrical facility. For example, the power receiving level needed by the load facilities 600 can be output as a demand. The demand receiving unit 152 receives a demanded level from another electrical facility, and stores the received demanded level in the memory unit 170.

(5) Negotiation Unit

The negotiation unit 160 mutually presents information on a target electrical quantity (performs a negotiation process) with another smart interface 100, and adjusts the electrical quantity of the local facility.

Such a negotiation process is carried out by the adjoining nodes (the smart interfaces 100) that present information with each other. That is, the negotiation process is carried out not based on an instruction from the center EMS through broadcasting.

To execute a calculation process of the electrical quantity by the negotiation unit 160, in order to ensure a consistency with the calculation by another node, a token that is a privilege of performing calculation preferentially from another can be used.

The negotiation unit 160 includes a target level setting unit (TLSU) 161, a presenting level deciding unit (PLDU) 162, a presenting level output unit (PLOU) 163, a presenting level receiving unit (PLRU) 164, an adjusting unit 165, and a decision processing unit 166, etc.

The target level setting unit 161 sets a target level that is the target electricity quantity of the negotiation process. Example target levels are the power level demanded by the load facilities 600, and the target charging/discharging level of the battery facilities 200, the solar power generator facility 300 and the power generator facility 400. The target level includes one fixedly set as a total electrical quantity at the beginning of the negotiation and another successively changed and set through the negotiation.

For example, the electrical quantities that respective local facilities can mutually bear are presented, and when the total electrical quantity thereof reaches the demanded electrical quantity set as the target level, the negotiation can reach a settlement. Moreover, a result of subtracting the electrical quantity that the local facility can bear from the demanded electrical quantity set as the target level can be successively set as a next target level. Furthermore, when the local facility is the load facilities 600, as an initial value, the demanded level of the local facility is set as the target value, and when the demand is not satisfied, a target value successively decreased can be set next.

The presenting level deciding unit 162 decides a presenting level that is the electrical quantity to be presented to another smart interface 100 based on the various attribute parameters, such as the set target level and the allowable level of the local electrical facility. Regarding the presenting level, for example, in the case of the battery facilities 200, the solar power generator facility 300 and the power generator facility 400, a discharging level and a power generation level corresponding to a part of the demanded electrical quantity set as the target value can be presented as the presenting level.

Moreover, in the case of the load facilities 600, an electrical quantity satisfying the whole necessary electrical quantity set as the target value can be the presenting level. The presenting level in this case is a demanded level from the load for another smart interface 100, etc.

The presenting level output unit 163 outputs the set presenting level to the exterior. The output presenting level is transmitted by the communication control unit 120 to another smart interface 100 via the communication network N. The presenting level receiving unit 164 receives, when the communication control unit 120 receives the presenting level from another smart interface 100 via the communication network N, the received presenting level.

The adjusting unit 165 adjusts the presenting level. The adjusting unit 165 includes a comparing unit (CU) 165a, a supply-demand balance determining unit (SDBDU) 165b, an adjusting level deciding unit (ADLDU) 165c, and an adjustment instructing unit (AIU) 165d, etc.

The comparing unit 165a compares, for example, target values with the presenting level from the local facility and the presenting level from another smart interface 100. The supply-demand balance determining unit 165b determines whether or not a supply-demand balance is accomplished based on a comparison result by the comparing unit 165a.

The adjusting level deciding unit 165c sets an adjusting level of the presenting level based on the comparison result by the comparing unit 165a, the determination result by the supply-demand balance determining unit 165b, and the attribute parameters, etc. The adjustment instructing unit 165d instructs adjustment of the presenting level by the presenting level deciding unit 162 based on the adjusting level set by the adjusting level deciding unit 165c.

The decision process unit 166 executes a process for deciding an electrical quantity. The decision process unit 166 includes an electrical quantity deciding unit (EQDU) 166a, a decision signal output unit (DSOU) 166b, a decision signal receiving unit (DSRU) 166c, an allowance signal output unit (ASOU) 166d, and an allowance signal receiving unit (ASRU) 166e, etc.

The electrical quantity deciding unit 166a decides the electrical quantity of the local facility when the supply-demand balance determining unit 165b determines that the supply-demand balance is accomplished. The decision signal output unit 166b outputs a decision signal (e.g., a supply-demand balance accomplishment signal, a supply-demand balance recovery signal) including the decided electrical quantity. The decision signal receiving unit 166c receives the decision signal input from the exterior.

The allowance signal output unit 166d outputs an allowance signal (e.g., a power consumption allowance signal) that permits the use of the decided power. The allowance signal receiving unit 166e receives the allowance signal input from the exterior.

<2. Memory Unit>

The memory unit 170 stores various pieces of information necessary for the smart interface 100 as explained above. The memory area of each information in the memory unit 170 configures a memory section of each information. That is, the memory unit 170 includes a software memory section (SME) 171, an authentication information memory section (AIMS) 172, an external state memory section (ESMS) 173, an internal state memory section (ISMS) 174, an attribute parameter memory section (APMS) 175, a target level memory section (TLMS) 176, a presenting level memory section (PLMS) 177, and a decided electrical quantity memory section (DEQMS) 178, etc. The memory unit 170 also has a setting memory section (SMS) 179 that stores various settings necessary for the process by the control unit 110. Such setting includes, for example, criterions for a process, such as an operational expression in each processing unit, a parameter used for such an operational expression, and a threshold for determination.

<3. Input Unit>

The input unit 180 is for inputting information necessary for the smart interface 100, a selection of a process, and an instruction, etc. Examples of the input unit 180 are a keyboard, a mouse, a touch panel (including one configured as a display device), and a switch. However, it includes all input devices available presently or in future. The information to be stored in the memory unit 170 can be input through the input unit 180.

<4. Output Unit>

The output unit 190 outputs the power-generation-level predicting model, the internal state, the external state, and the attribute parameters, etc., to a user including an administrator, an operator, etc., in a recognizable manner. Examples of the output unit 190 are a display device and a printer. However, it includes all output devices available presently and in future.

<<Battery Facilities>>

The battery facilities 200 utilize secondary batteries that can perform both charging and discharging. A lead battery, a lithium ion battery, a nickel-hydrogen battery, etc., are widely used, but all batteries available presently and in future are included in the examples of the battery facilities 200.

<<Solar Power Generator Facility>>

The solar power generator facility 300 is a power generator facility including solar panels that convert solar light energy into electrical energy. The solar power generation outputs no $CO_2$, and has little influence on the environment. Hence, according to the power supply system 1, when the power generation level by the solar power generator facility 300 is large, it is desirable to adjust that such generated power should be preferentially used.

Moreover, when the power generation level by the solar power generator facility 300 is large, it is desirable for the power supply system 1 to switch the battery facilities 200 to be in a charging condition depending on the situation. This enables the power supply system 1 to efficiently accumulate the excess power by the solar power generator facility 300 and to feed the power for a long time.

Conversely, the power generation level by the solar power generator facility 300 largely depends on a weather, etc., as explained above. Hence, when the power generation level by the solar power generation facility 300 is little, the power supply system 1 performs a control so as to compensate such little power generation by the discharging of the battery facilities 200 and the power generation by the power generator facility 400.

<<Power Generator Facility>>

The power generator facility 400 is a private power generator facility that generates power using various fuels as energy sources. For example, the power generator facility 400 includes a private power generator like an engine that generates power using a fossil fuel like a gas or a heavy fuel. It is typically expected that such power generators exhaust $CO_2$. Hence, it is desirable for the power supply system 1 to obtain power from the power generator facility 400 only when it is necessary, and to adjust the power generation by such power generators to maintain a low average value.

Fuel cells, etc., are also included in the power generator facility 400. When fuel cells are applied, the amount of $CO_2$ exhausted can be remarkably reduced, and thus the use level of such fuel cells can be increased than that of the above-explained engine, etc.

<<Power Receiving Point>>

The power receiving point (the meter) 500 is a facility connected to a commercial system (a power system), and controls feeding-receiving of power with the commercial system. For example, when the electrical quantity necessary for the load facilities 600 cannot be covered by the solar power generator facility 300, the battery facilities 200, and the power generator facility 400, it can be controlled so as to receive the power by what corresponds to the power shortage from the commercial system. Moreover, the excess power by the solar power generator facility 300 can be supplied to the commercial system as a reverse power flow.

<<Load Facility>>

The load facilities 600 consume power. The load facilities 600 include, for example, an electric motor, and various electrical equipments. The necessary power level for each electric motor and electric equipment is fixed to some level, but when, for example, the number of actuation of plural equipments is changed, the activation time is changed or the output thereof is reduced, the necessary electrical quantity can be adjusted.

Adjustment is enabled when a load rejection is performed for each outlet depending on the preference of the load facilities 600 (e.g., the preference order is set for each load facilities 600 or each equipment, or distinctions are made like "general" and "important") and the electrical quantity suppliable. When, for example, there are plural electric motors, in order to relieve the concentration of the electrical quantity due to inrush currents at the time of actuation, it is possible to control the actuation time shifted. As explained above, the power shortage can be compensated also by adjusting the load side.

<<PCS>>

The PCS 700 is a power conditioner (a power conditioning system). The PCS 700 basically includes an inverter, and is capable of adjusting the output by the solar power generator facility 300, the battery facilities 200, and a change in phase, etc. The smart interface 100 can control the local facility through the PCS 700.

It is not illustrated in the figure but the PCS 700 includes a power system status detecting unit that detects the status of a linked power system. Accordingly, when, for example, the power system status detecting unit detects the electricity failure of the power system, the local facility can operate individually. It is also possible to adjust the phase of an AC voltage in accordance with the status of the power system.

Note that a part of the function of the PCS 700 can be borne by the smart interface 100, and a part of the function of the smart interface 100 can be borne by the PCS 700, vice versa.

<<Host Smart Interface>>

The host smart interface 100U basically employs the same configuration as that of the smart interface 100. However, the host smart Interface 100U includes a collecting unit and a dividing unit, etc., although which are not illustrated.

The collecting unit collects information. For example, the memory unit 170 of the host smart interface 100U stores pieces of information collected from respective slave smart interfaces 100 via the communication network N. The collecting unit is capable of summarizing specific kinds of information from those pieces of information and redefining information. The redefined information is stored in the memory unit, and is utilized in the interior or the exterior of the power supply system 1.

For example, the collecting unit collects the attribute parameters relating to the discharging level, etc., of the plurality of battery facilities 200, and can obtain information that defines the plurality of battery facilities 200 as a virtual solo battery facility 200. Moreover, when the charging level of the plurality of battery facilities 200, the dischargeable level thereof, and the predicted power generation level, etc., of the solar power generator facility 300 are collected, those pieces of information can be defined as an electrical quantity suppliable by a whole system. Furthermore, a value obtained by subtracting the suppliable electrical quantity from the necessary electrical quantity for the plurality of load facilities 600 can be defined as a power shortage of the whole system.

Accordingly, the host smart interface 100U can manage the whole energy without considering the status of each electrical facility, etc. For example, the host smart interface 100U can perform mutual supply-demand control with another power supply system that is different from the local power supply system 1 based on the collected information.

In particular, it is presumed that the host smart interface 100U is connected to the host smart interface 100U of another power supply system via the communication network N. In this case, respective host smart interfaces 100U can perform negotiation with each other so as to accommodate the power.

At this time, it is not necessary for the host smart interface 100U to grasp the attribute parameters for each electrical facility. Respective host smart interfaces 1000 can perform negotiation based on, for example, the whole suppliable power by each power supply system 1 and the whole power shortage thereof. The collected information can be transmitted to a power feeding instructing station, etc., and utilized at a frequency control system (AFC) or a supply-demand control system (ELD)

The dividing unit divides the collected information. The pieces of information collected by the collecting unit or the pieces of collected information input from the exterior can be divided and redefined for each electrical facility. The divided information is distributed to respective smart interfaces 100 via the communication network N.

For example, the dividing unit can divides the total accommodated power demanded from the exterior into the charging level and the discharging demanded level, etc., of each battery facility 200 to redefine the attribute parameters. Hence, the management of the whole energy can be smoothly carried out with another system different from the system managed by the local host smart interface 100U without considering the internal state of individual battery.

<<Server Device>>

The server device 800 is a data server that stores necessary information for the smart interfaces 100 and the host smart interface 100U. For example, the server device 800 stores the attribute parameters of each electric equipment and the latest software.

Respective smart interfaces 100 and the host smart interface 100U access the server device 800 via the communication network N, and refer to and download the attribute parameters of another electrical facility and the latest version of the application software.

The server device 800 may configure all of or a part of the functions of respective memory units 170 of the smart interfaces 100 and the host smart interface 100U.

<Operation of Embodiment>

Next, an explanation will be below given of an operation of this embodiment with reference to FIGS. 4 to 7. First of all, it is presumed that the software managing unit 131 updates the version of the application software, etc., to be the latest. Moreover, it is presumed that the monitoring unit 142 monitors the external state and only the sound electrical facilities are subjected to an adjustment of an electrical quantity.

Furthermore, when a new smart interface 100 is connected to the communication network N, the registering unit 143 stores the attribute parameters of the new smart interface 100 in the memory unit 170 and the new smart interface 100 is registered as a node. Accordingly, the electrical facility connected to the new smart interface 100 is also subjected to an adjustment of an electrical quantity. The authentication of the mutual communication of the smart interfaces 100 is performed by the authenticating unit 144.

<<Adjustment at Power Generator Facility and Battery Facility>>

Next, an illustrative adjusting process of the power generation level or the discharging level when the local facility is the battery facilities 200, the solar power generator facility 300 or the power generator facility 400 will be explained with reference to FIG. 4. First, the internal state detecting unit 132 always detects the internal state of the local facility (step 01). The memory unit 170 stores the detected internal state.

Based on the internal state, the allowable level determining unit 133 determines the power level (allowable level) generatable or dischargeable by the local facility (step 02). The memory unit 170 also stores such an allowable level as the internal state. When the communication control unit 120 receives no demand for the power receiving level from the exterior (step 03: NO), the above-explained detection of the internal state is continued.

When the communication control unit 120 receives a demand for an electrical quantity from the exterior via the communication network N (step 03: YES), the demanded level is received by the demand receiving unit 152 of the demand processing unit 150 (step 04). The target level setting unit 161 sets a target level in accordance with the received demanded level (step 05). The memory unit 170 stores the set target level. For example, the power receiving level demanded from the load facilities 600 is set as the target level.

The presenting level deciding unit 162 decides a presenting level based on the set target level and various attribute parameters like the allowable level of the local facility (step 06). The memory unit 170 stores the decided presenting level. For example, in the case of the solar power generator facility 300, the power generation level and the predicted power generation level can be the presenting level. In the case of the battery facilities 200, some of the discharging level can be the presenting level.

The presenting level output unit 163 outputs the decided presenting level (step 07). The communication control unit 120 transmits this presenting level to another smart interface 100 via the communication network N. For example, the presenting level is transmitted to the smart interface 100 of the adjoining battery facility 200.

Moreover, when the communication control unit 120 receives the presenting level from the exterior (step 08: YES), the presenting level receiving unit 164 receives presenting level (step 09). The memory unit 170 stores the received presenting level.

The comparing unit 165a of the adjusting unit 165 compares the target level, the output presenting level, and the received presenting level (when the presenting level is received from the exterior), etc, (step 10). Based on the comparison result, the supply-demand balance determining unit 165b determines whether or not a supply-demand balance can be accomplished based on the presence/absence of the shortage of the presenting level to the target level (step 11).

When the supply-demand balance is not accomplished (step 11: NO), the adjustment level deciding unit 165c decides the adjusting level of the presenting level (step 12). The adjusting level deciding unit 165c can decide the adjusting level in consideration of various attribute parameters. For example, in the decision of the adjusting level, the distribution ratio of the power to another smart interface 100 can be set to be equal, the power can be distributed in accordance with the supply capability of the local or another electrical facility.

Based on the adjusting level, the adjustment instructing unit 165d instructs the presenting level deciding unit 162 to decide a new presenting level (step 13). Thereafter, the presenting level deciding unit 162 decides a new presenting level (step 06), and the processes from the steps 07 to 11 are executed.

When the supply-demand balance determining unit 165b determines that the supply-demand balance is accomplished (step 11: YES), the electrical quantity deciding unit 166a decides the electrical quantity (the power generation level, the discharging level, etc.) borne by the local facility (step 14). The decision signal output unit 166b outputs a supply-demand balance accomplishment signal together with the decided electrical quantity (step 15).

Moreover, the allowance signal output unit 166d outputs an allowance signal of the power consumption (step 16). The communication control unit 120 transmits the supply-demand balance accomplishment signal, the decided electrical quantity, and the allowance signal of the power consumption, etc., to another smart interface 100.

<<Adjustment at Load Facility Side>>

Figure 5:
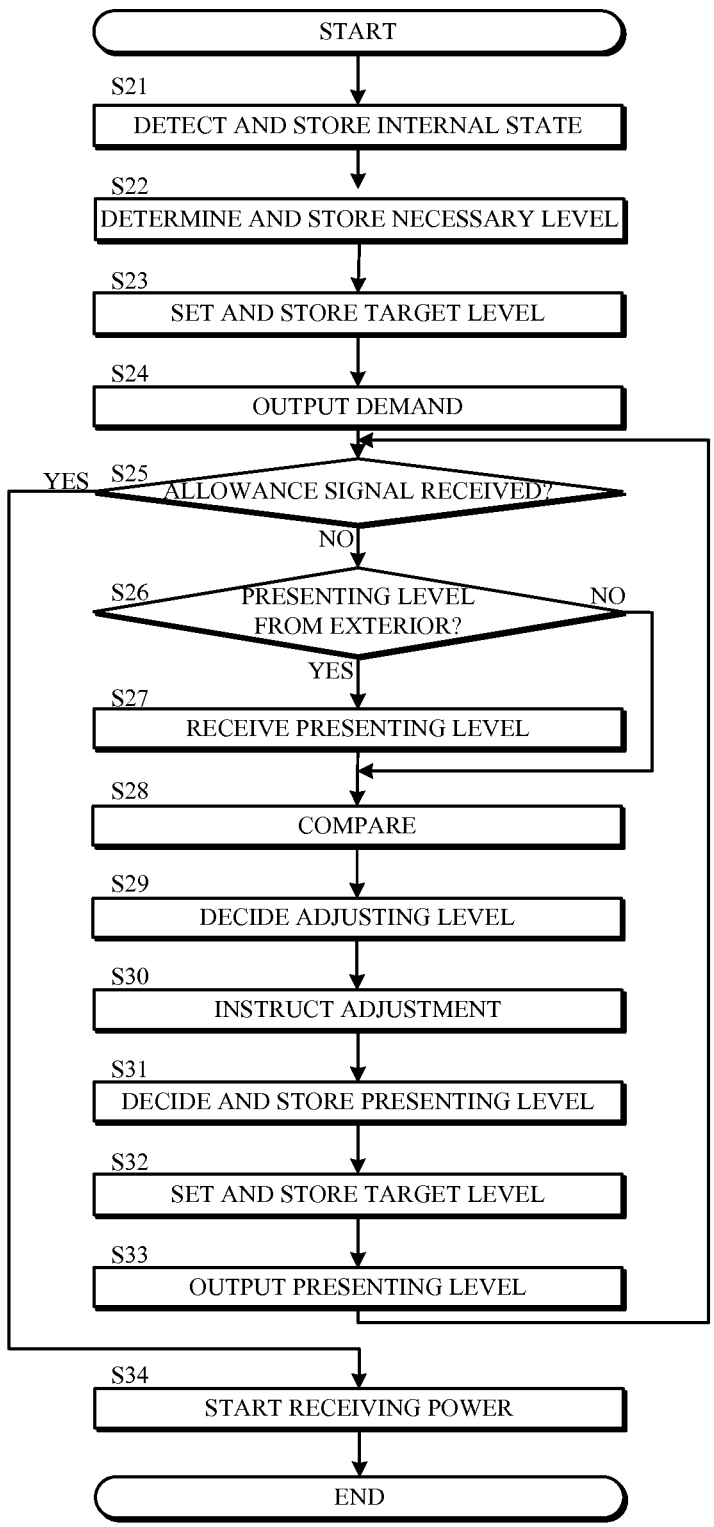
FIG. 5 is a flowchart showing an electrical quantity setting process by a smart interface at a load side.

Next, an explanation will be given of an example case in which the local facility is the load facilities 600 with reference to FIG. 5. First, the internal state detecting unit 132 always detects the internal state of the local facility (step 21). Based on the detected internal state, the demanded level determining unit 134 determines the power receiving level (which is also the internal state) necessary for the local facility as a necessary level (step 22). The memory unit 170 stores such a necessary level as the internal state.

Moreover, the target level setting unit 161 sets the necessary level as a target level to be decided (step 23). The memory unit 170 stores the set target level. The demand output unit 151 outputs the necessary level as a demanded level (step 24). The communication control unit 120 transmits the demanded level to another smart interface 100 is the communication network N.

Figure 4:
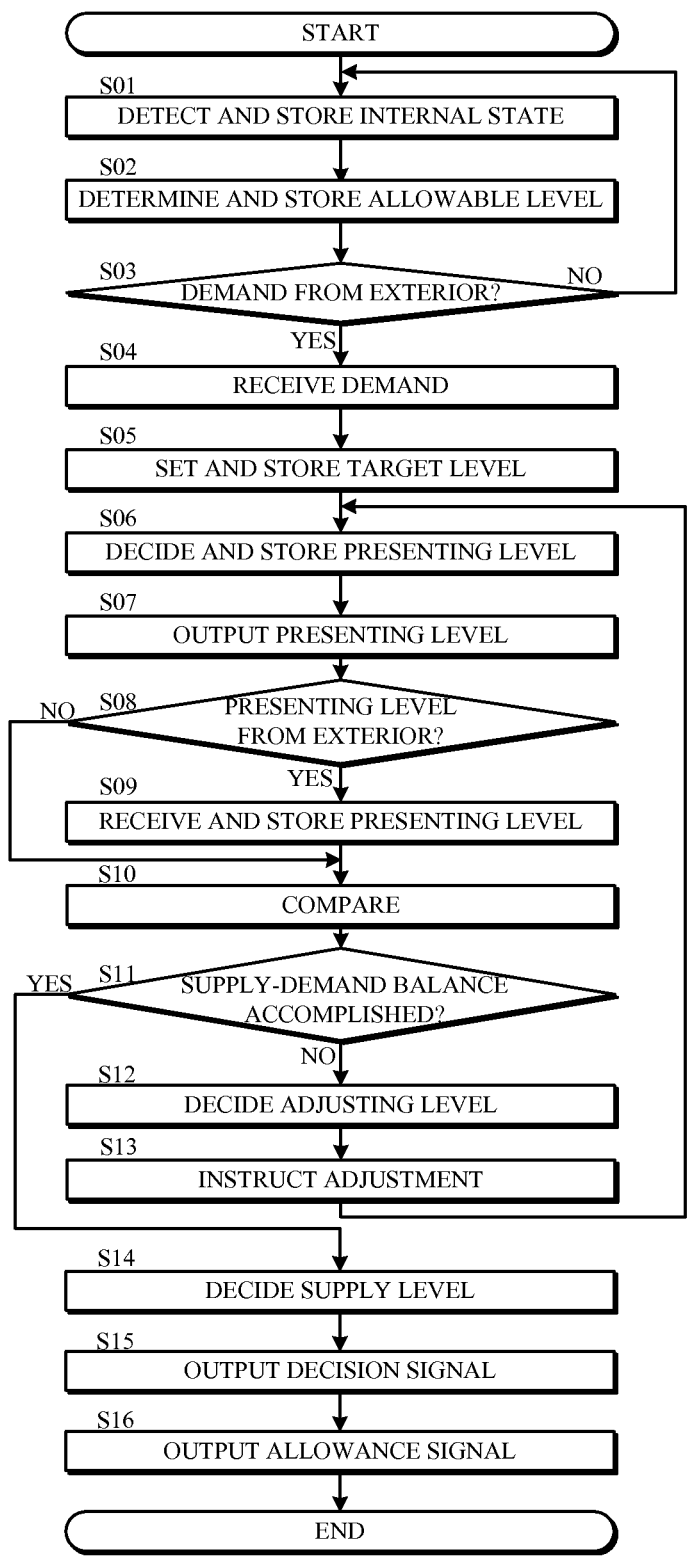
FIG. 4 is a flowchart showing an electrical quantity setting process by a smart interface at a power-generating/discharging side.

When the demand receiving unit 152 of another smart interface 100 receives the demanded level output in this manner, the processes of the steps 03 to 16 shown in FIG. 4 are executed. As a result, when the communication control unit 120 receives the allowance signal of the power consumption via the communication network N, the allowance signal receiving unit 166e receives the allowance signal (step 25: YES). This triggers the local facility control unit 136 to control the PCS 700 so as to start receiving power to the load facilities 600 (step 34).

However, depending on the process result and the demanded power receiving level shown in FIG. 4, the supply-demand balance cannot be accomplished in some cases. In this case, for example, no allowance signal is received after a predetermined time has elapsed (step 25: NO).

In this case, when the presenting level for the electrical quantity suppliable from the exterior is received (step 26: YES), the presenting level receiving unit 163 receives this presenting level (step 27). The memory unit 170 stores the received presenting level. When no presenting level is received (step 26: NO), the process progresses to the process in step 28.

Such a presenting level may be, for example, a part of or all of the power generation level of the solar power generator facility 300 and the power generator facility 400 or a part of or all of the discharging level of the battery facilities 200 transmitted from the external smart interface 100. Moreover, the presenting level may be the power level suppliable by the whole power supply system 1 and transmitted from the host smart interface 100U.

The comparing unit 165a of the adjusting unit 165 compares the target level, the adjustment allowable level of the local facility, and the received presenting level (when such a presenting level is received), etc, (step 28). Based on the comparison result, the adjusting level deciding unit 165c decides the adjusting level of the presenting level (step 29). The adjusting level deciding unit 165c can decide the adjusting level in consideration of various attribute parameters.

The adjustment instructing unit 165d instructs the presenting level deciding unit 162 to decide a new presenting level based on the decided adjusting level (step 30). The presenting level deciding unit 162 decides the new presenting level (step 31). The memory unit 170 stores the new presenting level. The target level setting unit 161 sets the decided presenting level as a new target level (step 32). The memory unit 170 stores the set target level.

The presenting level output unit 163 outputs the decided presenting level (step 33). The communication control unit 120 transmits this presenting level to another smart interface 100 via the communication network N. Thereafter, the processes of steps 25 to 34 are executed. When an adjustment becomes necessary, the local facility control unit 136 adjusts the power receiving level based on, for example, the number of actuation of equipments, an operation time, an actuation timing, and the number of outlets to be used.

<<Specific Example of Negotiation>>

1. Example Consensus Algorithm>

Next, an explanation will be given of a specific example of the above-explained negotiation process. First of all, it is disclosed in Wei Ron and Randal W. Beard, "Distributed Consensus in Multi-Vehicle Cooperative Control", published by Springer-Verlag (London), Communication and Control Engineering Series, 2008, ISBN: 978-1-84800-014-8, pages 25 and 26 (Formulation of Consensus Algorithm) and pages 38 to 41 (Mathematical Basis for Convergence) that a plurality of nodes can be converged into a common state quantity while mutually exchanging information. This literature also discloses a consensus algorithm for a node group with a plurality of communication functions which communicates with only a local and adjoining node with each other.

That is, it is presumed that a state quantity of an i-th node at a discrete time $k+1$ is $\xi i[k+1]$. Next, it is also presumed that successive update is performed through the following formula based on the state quantities $\xi j[k]$, where $j=1, \ldots n$ of the local and adjoining nodes at a time k. In this case, it is mathematically proved that the state quantities $\xi i[k]$, where $i=1, \ldots n$, in n number of all nodes conform to the common value at a time $k \to \infty$.

$$\xi i[k+1] = \sum_{j=1}^{n} dij[k]\, \xi j[k], \, i = 1, \ldots, n \quad \text{[Formula 1]}$$

(where dij is an appropriate weight coefficient, $dij \geq 0$, and the following formula $$\sum dij[k] \underset{j=1}{\overset{n}{1}}, i = 1, \ldots, n$$

is satisfied.)

However, this embodiment is not to simply accomplish the convergence to the common state quantity. Respective smart interfaces 100 have a function of exchanging the presenting level that is the distribution quantity of the electrical quantity for respective local facilities in consideration of various attribute parameters, and of accomplishing the supply-demand balance at the optimized distribution.

<2. Supply-Demand Balance Accomplishing Process>

Figure 6:
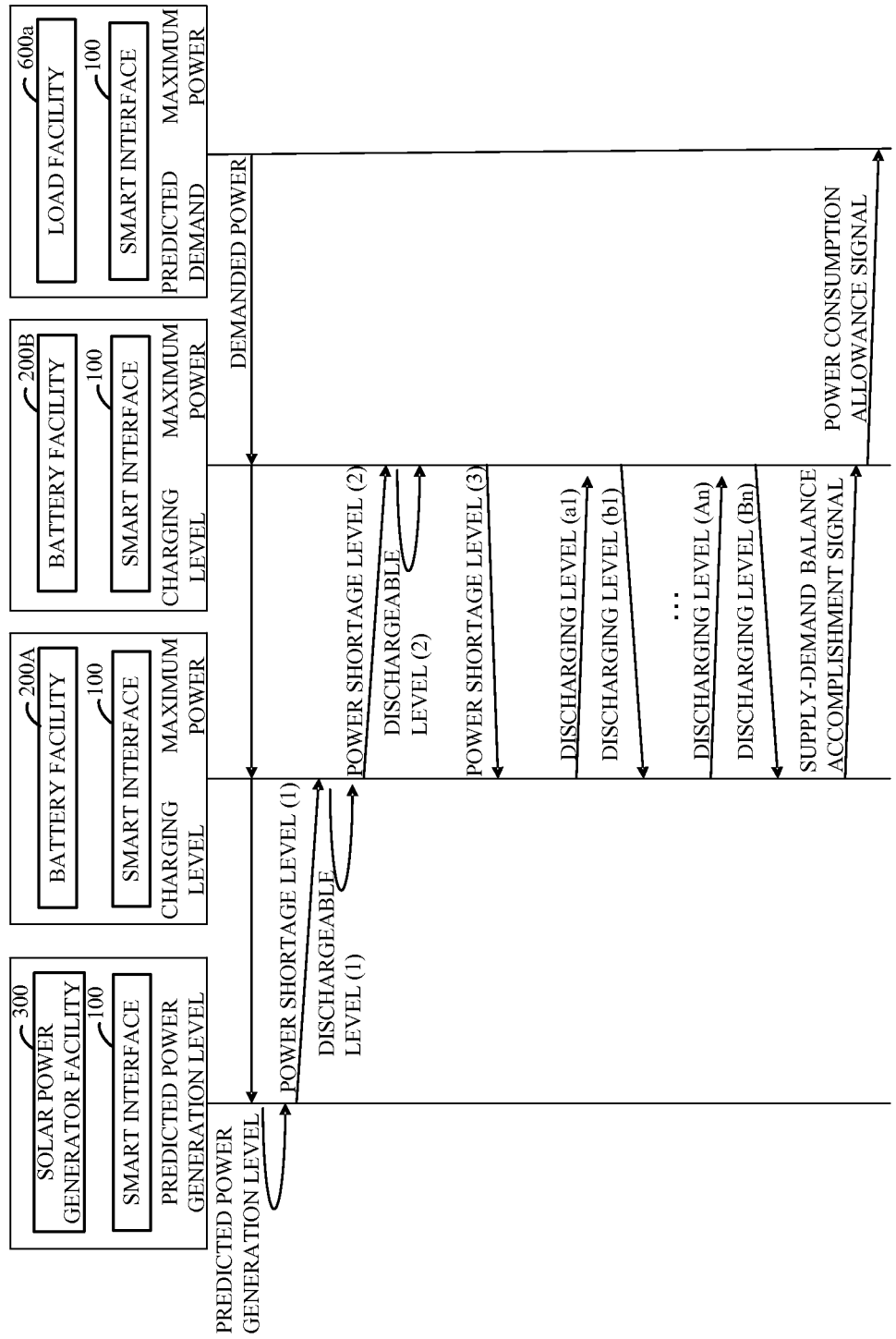
FIG. 6 is an explanatory diagram for a supply-demand balance adjusting process by solar power generator facility and battery facilities in accordance with demanded power by load facilities.
Figure 7:
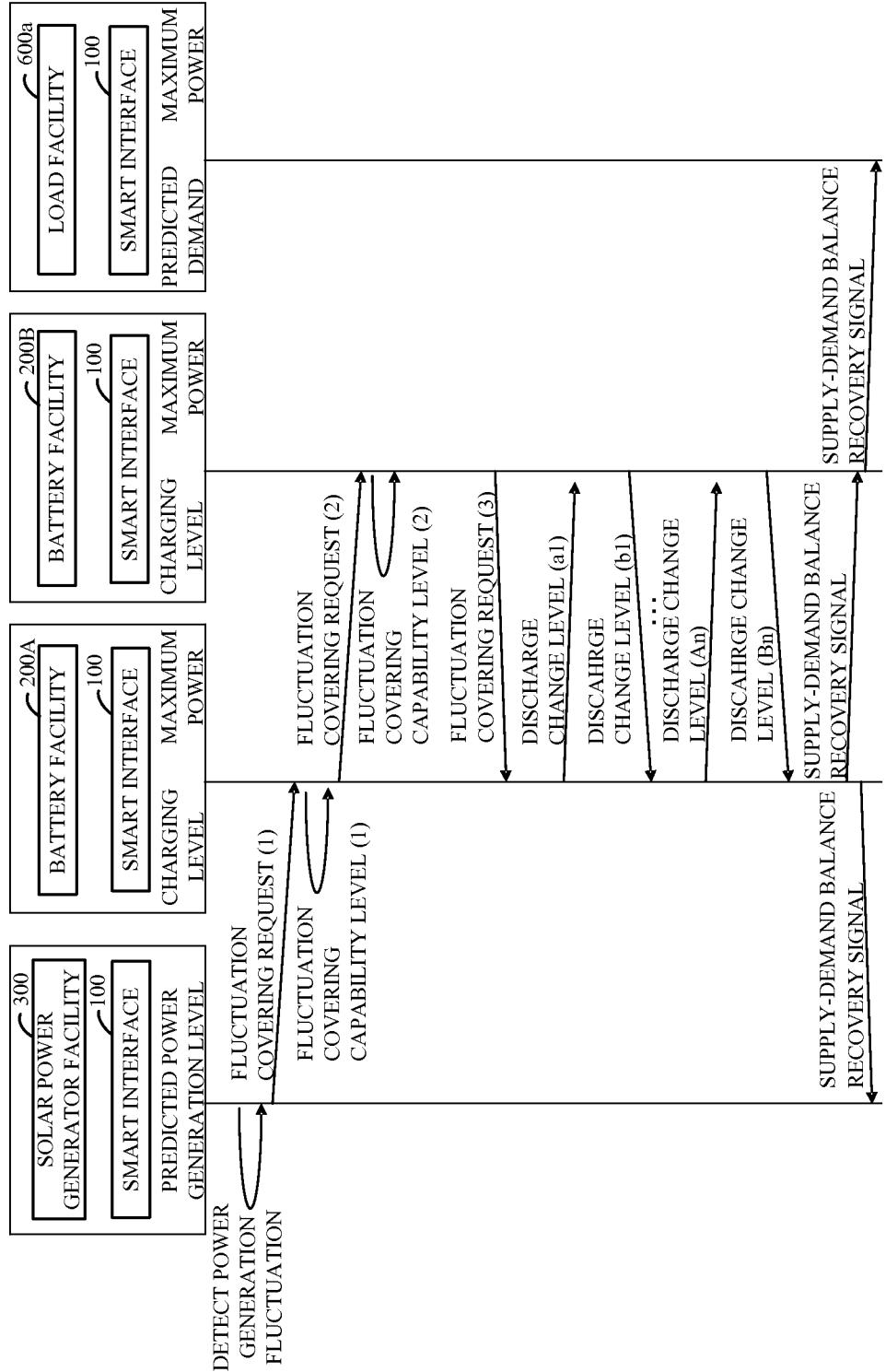
FIG. 7 is an explanatory diagram for a supply-demand balance adjusting process in accordance with a change in the power generation level by the solar power generator facility.

Next, for a supply-demand balance accomplishing process, information exchanged between respective smart interfaces 100 is represented graphically as a communication protocol in FIGS. 6 and 7. Those figures are illustrative negotiation between respective smart interfaces 100 of the solar power generator facility 300, a battery facility 200A, a battery facility 200B, and a load facility 600a.

Information is exchanged between respective smart interfaces 100 connected to respective facilities. In the following explanation, however, in order to clarify the subject, the local facility of each smart interface 100 will be used as a subject to simplify the explanation. Moreover, the processes, for example, of exchanging, inputting and outputting, detecting, comparing, determining, deciding, instructing, and storing information are performed by respective units of each smart interface 100.

(1) Process Based On Predicted Level

FIG. 6 shows an example negotiation of the solar power generator facility 300, the battery facility 200A, and the battery facility 200B to accomplish the supply-demand balance in accordance with the demanded power based on a demand prediction from the load facility 600a.

First, the power level demanded by the load facility 600a is successively transmitted to the battery facilities 200A, 200B, and the solar power generator facility 300, and is shared by respective facilities. The solar power generator facility 300 decides a power shortage level (1) based on a comparison between the demanded power level and the predicted power generation level of the solar power generator facility 300, and transmits the decided shortage level (1) as a demanded level to the battery facility 200A.

The battery facility 200A decides a power shortage level (2) based on a comparison between a dischargeable level (1) of the battery facility 200A and the power shortage level (1), and transmits the decided power shortage level (2) as a demanded level to the battery facility 200B.

The battery facility 200B decides a power shortage level (3) based on a comparison between a dischargeable level (2) of the battery facility 200B and the power shortage level (2), and transmits the decided shortage level (3) as a demanded level to the battery facility 200A. The dischargeable levels (1) and (2) are not the maximum dischargeable levels of the battery facilities 200A and 200B but are presenting levels presented at first.

The battery facilities 200A and 200B present respective presenting levels with each other with the power shortage level (3) being as a target level. That is, the battery facility 200A transmits a discharging level (a1) as the presenting level. In response to this presenting level, the battery facility 200B transmits a discharging level (b1) as the presenting level. The negotiation is repeated until the supply-demand balance is accomplished.

Next, after exchanging of a discharging level (An) and a discharging level (Bn), the battery facility 200A determines that the supply-demand balance is accomplished. The battery facility 200A transmits the supply-demand balance accomplishment signal to the battery facility 200B. The battery facility 200B having received the supply-demand balance accomplishment signal transmits an allowance signal of the consumption of load power to the load facility 600a.

(2) Process Based On Detection of Power Generation Fluctuation

FIG. 7 shows an example negotiation of the battery facilities 200A and 200B to recover the supply-demand balance in accordance with the fluctuation of the predicted power generation level of the solar power generator facility 300.

First, the solar power generator facility 300 detects a fluctuation of the predicted power generation level based on the internal state. Next, the solar power generator facility 300 transmits, as a demanding power level (a power shortage level), a fluctuation covering demand (1) that requests the covering of the fluctuation to the battery facility 200A.

The battery facility 200A decides a fluctuation covering request (2) based on a comparison between a fluctuation covering capability level (1) by the discharge by the battery facility 200A and the fluctuation covering demand (1), and transmits the decided fluctuation covering request (2) as a demanding power level to the battery facility 200B.

The battery facility 200B decides a fluctuation covering demand (3) based on a comparison between a fluctuation covering capability level (2) by the discharge by the battery facility 200B and the fluctuation covering demand (2), and transmits the decided fluctuation covering demand (3) as a demanding power level to the battery facility 200A. The fluctuation covering capability levels (1) and (2) are not the maximum dischargeable levels of the battery facilities 200A and 200B, but are presenting levels presented at first.

The battery facilities 200A and 200B present with each other respective presenting levels with the fluctuation covering demand (3) being as the target level. That is, the battery facility 200A transmits a discharge change level (a1) as the presenting level. In response to this presenting level, the battery facility 200B transmits a discharge change level (b1) as the presenting level. The negotiation is repeated until the supply-demand balance is accomplished.

After a discharge change level (An) and a discharge change level (Bn) are exchanged, the battery facility 200A determines that the supply-demand balance is accomplished. Next, the battery facility 200A transmits a supply-demand balance recovery signal to the solar power generator facility 300 and the battery facility 200B. The battery facility 200B that has received the supply-demand balance recovery signal transmits this signal to the load facility 600a.

As explained above, stable AC or DC power can be obtained through a cooperative operation of the solar power generator facility 300 and the battery facilities 200. The presenting level by each battery facility 200 can be decided in accordance with respective attribute parameters as explained above or in accordance with a criterion set in advance. As an example, the half of the suppliable level by the local facility is set to be as the first presenting level, next, the presenting level increased by the half of the former presenting level is presented, and the increase can be reduced by half successively. Alternatively, the presenting level can be incremented by a constant level set in advance.

<Advantage of Embodiment>

Advantages of the above-explained embodiment are as follows.

(1) Through a negotiation that a target electrical quantity is set between respective smart interfaces 100 and respective presenting levels are presented mutually, a supply-demand balance control of a mutual cooperative type can be performed. Hence, when the whole energy balance is disrupted due to the fluctuation of the power generation and the fluctuation of the load, the supply-demand balance can be quickly accomplished and recovered through information exchange and negotiation.

(2) The presenting levels mutually presented by respective smart interfaces 100 can be adjusted in accordance with the status of respective electrical facilities, and thus an appropriate load level for each electrical facility can be decided. In particular, various attribute parameters are shared and adjustment can be made in consideration of such parameters, the load level appropriate for the recent situation can be decided. Since, the updating of information like the version of the software is automatically carried out, and, for example, setting and calculation of an electrical quantity appropriate for the recent situation are enabled.

(3) Necessary processes for energy management and supply-demand balance control can be autonomously performed only through mutual communication between smart interfaces 100 connected to respective electrical facilities. That is, optimization of the supply-demand balance, the load distribution in the hierarchy through sharing of the attribute parameters, mutual authentication, mutual soundness monitoring, and bidirectional negotiation, and collection, distribution, and determination of information are automated.

(4) The power supply system 1 is automatically reconfigured in accordance with addition or elimination of an electrical facility that is a structural element and a state change, etc. Hence, the costs necessary for system reconfiguration and the engineering work therefor can be reduced.

(5) Each smart interface 100 is capable of autonomously reconfiguring the whole system in accordance with a connection of a new electrical facility, a loss of the function, addition or elimination of an electrical facility, and a state change. Hence, costs and engineering work necessary for system reconfiguration can be reduced.

A system reconfiguration is not limited to only addition or elimination of a node. For example, when new load facilities 600 are connected, it is possible to determined whether or not the power demanded by this load facilities 600 is suppliable from the already present facility, and execute processes of forbidding the power consumption when such demanded power is unsuppliable, requesting the reduction of the demanded power and permitting the power consumption when the new load facilities 600 accept the reduction of the demanded power.

D. Other Embodiments

The present invention is not limited to the above-explained embodiment.

(1) The number and scale, etc., of the electrical facilities managed by the power supply system 1 are not limited to any particular ones. It is fine whether respective electrical facilities are close to each other or located at remote locations geographically. Moreover, the power supply system 1 may include a plurality of host smart interfaces 100U, and each host smart interface 100U may manage a plurality of electrical facilities. For example, a host smart interface 100U may be set which comprehensively manages a plurality of power source groups each including the battery facilities 200, the solar power generator facility 300, and the power generator facility 400, etc. Alternatively, a host smart interface 100U that collectively manages a plurality of load groups including the load facilities 600 may be also set.

(2) The "electrical quantity" in the above-explained embodiment is a concept widely including information on power supplied by or to each electrical facility, and is not always consistent with a term used as a physical quantity based on electrical charge. For example, the battery charging level of the battery facility 200 is also included in the electrical quantity to be the target level or the presenting level. That is, the smart interface 100 of the battery facility 200 predicts, detects, etc., the battery charging state (SOC) from the internal state of the local facility, and outputs the demanded level of the power for battery charging. Next, the smart interface 100 of the electrical facility that can generate or discharge power presents the presenting level that is the suppliable power generation level or discharging level.

When the presenting level satisfies the demanded level, or when the presenting level satisfies a part of the demanded level, any one of the smart interfaces 100 outputs an allowance signal for battery charging, and the smart interface 100 which has received this signal starts charging of the battery facility 200. Note that the above-explained negotiation can be carried out between the smart interfaces 100 of the electrical facilities that can generate or discharge power.

As explained above, by managing the charging state of the battery facility 200 and optimizing the charging/discharging schedule thereof, the excess power by the solar power generator facility 300, etc., can be effectively accumulated, and a power feeding for a long time is enabled.

Conversely, the solar power generator facility 300 may detect the excess power, and distribute the excess power to the battery facility 200 that needs charging. That is, the smart interface 100 of the solar power generator facility 300 predicts, detects, etc., the excess power from the internal state of the local facility, and outputs a presenting level that is the suppliable power level. Next, the battery facility 200 needing a charging presents a demanded level that is the necessary power level.

When the presenting level matches the demanded level or matches a part of the demanded level, the smart interface 100 of the solar power generator facility 300 outputs an allowance signal for charging, and the smart interface 100 that has received this signal starts charging of the battery facility 200.

The above-explained negotiation may be carried out between respective smart interfaces 100 of the battery facilities 200 needing a charging.

As explained above, in addition to the power shortage level, the excess power is also a subject of adjustment of an electrical quantity and negotiation therefor by the smart interface 100.

Figure 8:
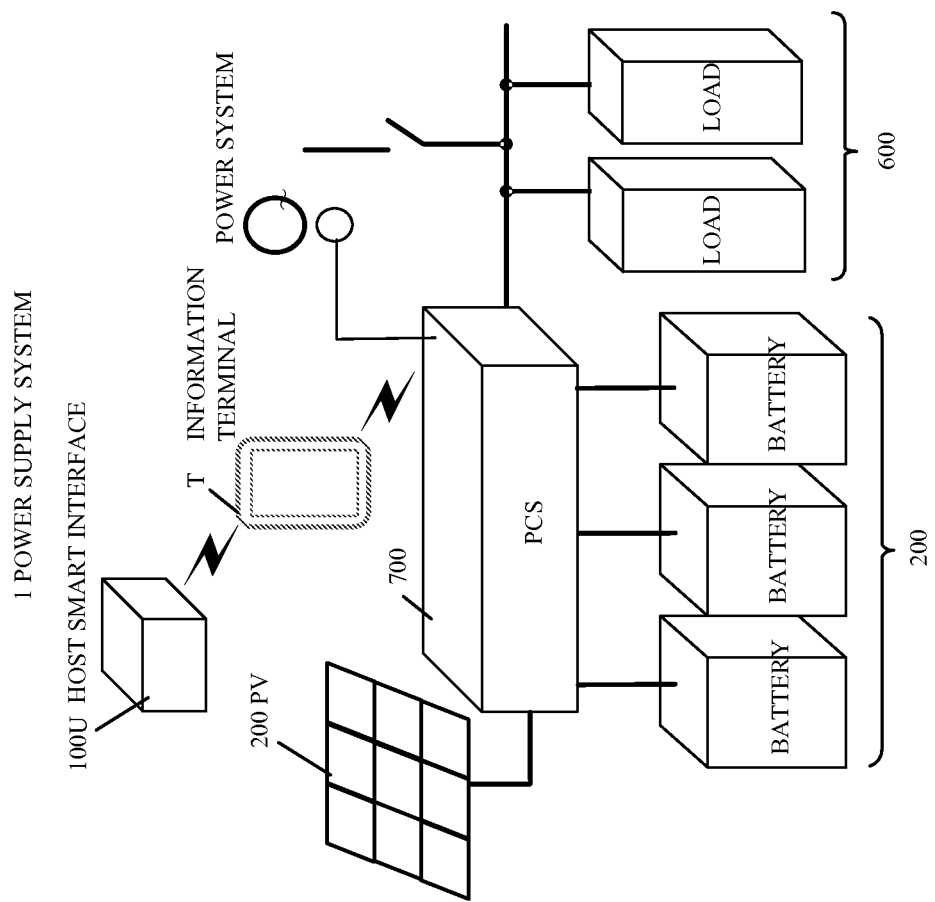
FIG. 8 is a connection configuration diagram showing another embodiment of the present invention.
Figure 9:
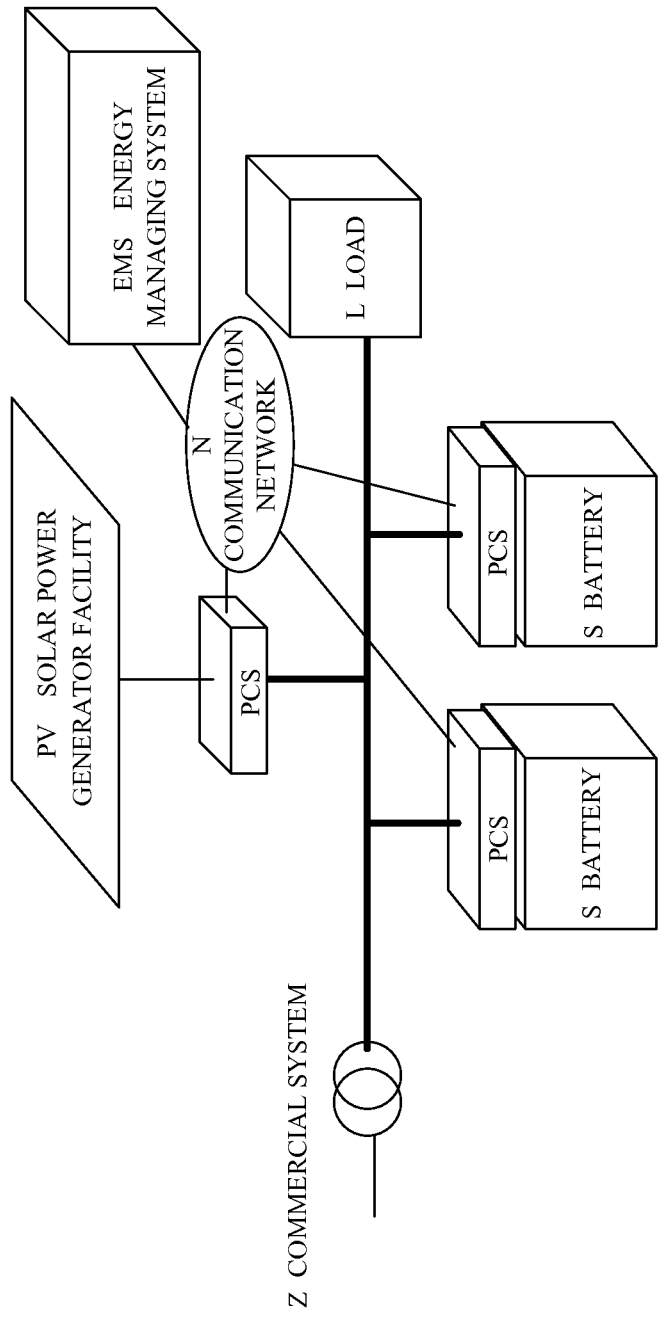
FIG. 9 is a connection configuration diagram showing an example of a conventional power supply system.

(3) The communication function can be backed up by an information terminal. For example, as shown in FIG. 8, an information terminal T is configured to be connectable with respective communication control units 120 of each smart interface 100 and the host smart interface 100U via another network different from the communication network N. The information terminal T includes various portable and network connectable computer available presently or in future, such as a cellular phone, a laptop computer, and a tablet PC.

According to this configuration, when the main communication network N breaks down, a communication between the smart interface 100 and the host smart interface 100U is established through the information terminal T. Accordingly, the communication between each smart interface 100 and the host smart interface 100U is backed up, and the functions of the power supply system 1, such as monitoring of a state and distribution of the attribute parameters, can be maintained.

This function can be applied to, for example, not only the one clarified in the above-explained embodiment, but also monitoring of the output by the solar power generator facility 300, the charging state of the battery facilities 200, and the supplied power to the load facilities 600, controlling of the charging/discharging schedule, and suppression and scheduling of a load. The information terminal T and the communication line may be general-purpose or exclusive ones, but it is desirable to select the information terminal and the communication line withstandable against disasters.

(4) The electrical facilities are not limited to the ones exemplified in the above-explained embodiment. For example, instead of or in addition to the solar power generator facility, all distributed power facilities available presently or in future can be used like a wind power generator facility.

(5) The processes explained in the above-explained embodiment are not limited to the procedures exemplified together with the operation and the flowchart. It can be changed as needed depending on whether the local facility is a power supply side or a power receiving side, whether or not to perform negotiation, and what is the power level to be decided, etc.

(6) The communication network and the communication line widely include a transmission channel that enables information exchange. As the transmission channel, all transmission media of both wired and wireless type can be applied, and it does not a matter what LAN or WAN intervenes or whether such LAN or WAN intervenes or not. For example, a PLC (Power Line Carrier) system can be applied. Regarding the communication protocol, ones available presently or in future can be applied. It may be a currently standard Internet protocol (IP4), a next-generation protocol (IP6), or a unique protocol.

(7) The smart interfaces 100, the host smart interface 100U, the PCSs 700, the server device 800, and the information terminal T, etc., can be each embodied by a computer including a CPU, etc., under a control of a predetermined program. The program in this case realizes the above-explained processes of respective units by physically utilizing the hardware resources of the computer.

A method and a program of executing the above-explained processes of respective units, and a recording medium recording therein such a program are also embodiments of the present invention. How to set the range processed by hardware resources and the range processed by software including such a program is not limited to any particular one. For example, any of the above-explained units can be configured as a circuit that realizes each process.

(8) Respective processing units and memory units, etc., can be realized on a common computer, or may be realized by a plurality of computers connected together over a communication network. Like the server device 800, a common data base may be used for the plurality of smart interfaces 100.

(9) The memory unit can be typically realized by internal or externally connected various memories, a hard disk, or an optical disk, etc., but all recording media available presently or in future can be used. A register, etc., used for calculation can be deemed as a part of the memory unit. A recording medium having already storing information can be loaded in a reader device to utilize such information and is available for an arithmetic processing. How to store information includes not only holding the stored information for a long time, but also temporal storing for a process, and elimination or updating within a short time.

(10) The specific contents and value of information used in the above-explained embodiment are optional, and are not limited to any particular contents and value. It is also optional in the embodiment of the largeness determination for a threshold and the consistency/inconsistency determination therefor that a value is included within the range of the threshold as the value equal to or greater than or equal to or smaller than the threshold. Moreover, it is also optional n such (determination that a value larger than or smaller than the threshold is out of the range of the threshold. Hence, depending on the setting of the value, even if the criteria "equal to or greater than" and "equal to or smaller than" are read as "larger than" and "smaller than", respectively, substantially same results can be obtained.

(11) Some embodiments of the present invention were explained above, but those embodiments are to exemplify the present invention, and are not to limit the scope and spirit of the present invention. Those embodiments can be carried out in the other various forms, and various omissions, replacement, and change can be made within the scope and spirit of the present invention. It should be understood that those embodiments and the modification thereof are within the scope and spirit of the present invention, and are within the range of the equivalence of the present invention set forth in the claims.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electrical quantity adjusting apparatus comprising a memory unit and a control unit,
    wherein the memory unit includes a target level memory section that stores a target level which is a target electrical quantity,
    wherein the control unit includes a negotiation unit which comprises:
        a presenting level deciding unit that decides a presenting level for outputting to an exterior electrical quantity adjusting apparatus, wherein the presenting level is an electrical quantity that relates to a local electrical facility to be connected and that corresponds to at least a part of the target level;
        a presenting level output unit that outputs the decided presenting level to the exterior electrical quantity adjusting apparatus;
        a presenting level receiving unit that receives a presenting level from the exterior electrical quantity adjusting apparatus via a communication network; and
        an adjusting unit that adjusts the electrical quantity that relates to the local electrical facility based on the target level, the presenting level decided by the presenting level deciding unit, and the presenting level received from the exterior electrical quantity adjusting apparatus by the presenting level receiving unit; and
    wherein the adjusting unit comprises:
        a comparing unit that compares the target level, the presenting level decided by the presenting level deciding unit and the presenting level received from the exterior electrical quantity adjusting apparatus by the presenting level receiving unit;
        a supply-demand balance determining unit that determines whether or not a supply-demand balance is accomplished based on a comparison result output from the comparing unit indicating a presence/absence of a shortage of the presenting levels to the target level;
        an adjusting level deciding unit that decides an adjusting level of the presenting level decided by the presenting level deciding unit when the supply-demand balance determining unit determines that the supply-demand balance is not accomplished;
        an adjustment instructing unit that instructs the presenting level deciding unit to decide a new presenting level based on the adjusting level decided by the adjusting level deciding unit, as a presenting level that the presenting level output unit outputs; and
        an electrical quantity deciding unit that decides an electrical quantity of the local electrical facility when the supply-demand balance determining unit determines that the supply-demand balance is accomplished through a negotiation in which the electrical quantity adjusting apparatus and the exterior electrical quantity adjusting apparatus mutually present respective adjusted presenting levels.

2. The electrical quantity adjusting apparatus according to claim 1, wherein the control unit further comprises a system managing unit,
    wherein the system managing unit comprises an attribute parameter receiving unit that receives an attribute parameter indicating an attribute of an electrical facility via the communication network, and
    wherein the memory unit further comprises an attribute parameter memory section that stores, as information for a process by at least one of the target level memory section, the presenting level deciding unit, and the adjusting unit, the attribute parameter received by the attribute parameter receiving unit.

3. The electrical quantity adjusting apparatus according to claim 2, further comprising an internal state detecting unit that detects an internal state of the connected electrical facility, wherein the attribute parameter includes the internal state.

4. The electrical quantity adjusting apparatus according to claim 2, wherein the attribute parameter includes at least one of information on a prediction of an electrical quantity; information on a change in an electrical quantity; information on a constraint of an electrical quantity; and information on costs of an electrical quantity.

5. The electrical quantity adjusting apparatus according to claim 2, wherein the attribute parameter includes identification information for identifying each electrical facility, and
wherein the system managing unit further comprises an authenticating unit that authenticates an electrical facility connected to another electrical quantity adjusting apparatus based on the identification information received by the attribute parameter receiving unit.

6. The electrical quantity adjusting apparatus according to claim 2, wherein the attribute parameter includes state information on a state of each electrical facility, and
wherein the system managing unit further comprises a monitoring unit that monitors a soundness of each electrical facility based on the state information received by the attribute parameter receiving unit.

7. The electrical quantity adjusting apparatus according to claim 1, further comprising:
a software memory section that stores a software for a process by at least one of the target level memory section, the presenting level deciding unit, and the adjusting unit;
a version determining unit that determines whether or not a version of the software stored in the software memory section is a latest version;
a downloading unit that downloads a software of the latest version based on a determination result by the version determining unit; and
an updating unit that updates the software to the latest version downloaded by the downloading unit.

8. The electrical quantity adjusting apparatus according to claim 1, further comprising a power system detecting unit that detects a state of a power system linked with a system where the electrical facility is connected.

9. The electrical quantity adjusting apparatus according to claim 1, further comprising:
a demand receiving unit that receives an electrical quantity demand from the exterior electrical quantity adjusting apparatus as the target level that the target level memory section stores; and
an allowance signal output unit that outputs an allowance signal that permits use of power as decided by the electrical quantity deciding unit.

10. The electrical quantity adjusting apparatus according to claim 9, further comprising:
an allowance signal receiving unit that receives an allowance signal output from the exterior electrical quantity adjusting apparatus;
an demand output unit that outputs a demand of a power receiving level necessary for the local facility; and
wherein the adjusting level deciding unit decides the adjusting level of the presenting level based on the comparison result of the comparing unit when no allowance signal is received.

11. A power supply system comprising:
the electrical quantity adjusting apparatus according to claim 2; and
a host managing device that is connected to the electrical quantity adjusting apparatus via the communication network,
wherein the host managing device comprises a collecting unit that collects attribute parameters of a plurality of electrical facilities; and a memory unit that stores the collected attribute parameters.

12. The power supply system according to claim 11, wherein the host managing device further comprises:
a dividing unit that divides the attribute parameters collected by the collecting unit for each of the plurality of electrical facilities; and
an output unit that outputs a divided attribute parameter to an electrical quantity adjusting apparatus of each of the plurality of electrical facilities via the communication network.

13. A power supply system comprising:
the electrical quantity adjusting apparatus according to claim 2; and
an information terminal that is connected to the electrical quantity adjusting apparatus via another communication network different from the communication network.

14. An electrical quantity adjusting method of an electrical quantity adjusting apparatus, the method comprising:
storing a target level that is a target electrical quantity;
deciding a presenting level for outputting to an exterior electrical quantity adjusting apparatus, wherein the presenting level is an electrical quantity that relates to a connected local electrical facility and that corresponds to at least a part of the target level;
outputting the decided presenting level to the exterior electrical quantity adjusting apparatus;
receiving a presenting level from the exterior electrical quantity adjusting apparatus via a communication network; and
adjusting the electrical quantity that relates to the local electrical facility based on the target level, the decided presenting level, and the presenting level received from the exterior electrical quantity adjusting apparatus, by:
comparing the target level, the decided presenting level and the presenting level received from the exterior electrical quantity adjusting apparatus;
determining whether or not a supply-demand balance is accomplished based on a comparison result of the comparison indicating a presence/absence of a shortage of the presenting levels to the target level;
deciding an adjusting level of the decided presenting level when it is determined that the supply-demand balance is not accomplished;
instructing the deciding of a new presenting level based on the decided adjusting level, as the output decided presenting level; and
deciding an electrical quantity of the local electrical facility when it is determined that the supply-demand balance is accomplished through a negotiation in which the electrical quantity adjusting apparatus and the exterior electrical quantity adjusting apparatus mutually present respective adjusted presenting levels.

15. A non-transitory computer-readable recording medium having a program stored thereon that is executable by a computer of an electrical quantity adjusting apparatus, the program causing the computer to perform functions comprising:
storing a target level that is a target electrical quantity;
deciding a presenting level for outputting to an exterior electrical quantity adjusting apparatus, wherein the presenting level is an electrical quantity that relates to a connected local electrical facility and that corresponds to at least a part of the target level;
outputting the decided presenting level to the exterior electrical quantity adjusting apparatus;
receiving a presenting level from the exterior electrical quantity adjusting apparatus via a communication network; and adjusting the electrical quantity that relates to the local electrical facility based on the target level, the decided presenting level, and the presenting level received from the exterior electrical quantity adjusting apparatus, by:

comparing the target level, the decided presenting level and the presenting level received from the exterior electrical quantity adjusting apparatus;

determining whether or not a supply-demand balance is accomplished based on a comparison result of the comparison indicating a presence/absence of a shortage of the presenting levels to the target level;

deciding an adjusting level of the decided presenting level when it is determined that the supply-demand balance is not accomplished;

instructing the deciding of a new presenting level based on the decided adjusting level, as the output decided presenting level; and deciding an electrical quantity of the local electrical facility when it is determined that the supply-demand balance is accomplished through a negotiation in which the electrical quantity adjusting apparatus and the exterior electrical quantity adjusting apparatus mutually present respective adjusted presenting levels.

* * * * *